(12) United States Patent
Poussiere et al.

(10) Patent No.: US 10,141,965 B2
(45) Date of Patent: Nov. 27, 2018

(54) METHOD AND EQUIPMENT FOR CONFIGURING RADIO COMMUNICATIONS

(75) Inventors: Fabrice Poussiere, Nozay (FR); Ronan Daniellou, Nozay (FR); Mathieu Beauvais, Nozay (FR)

(73) Assignee: Alcatel Lucent, Boulogne Billancourt (FR)

( * ) Notice: Subject to any disclaimer, the term of this patent is extended or adjusted under 35 U.S.C. 154(b) by 1113 days.

(21) Appl. No.: 12/699,531

(22) Filed: Feb. 3, 2010

(65) Prior Publication Data

US 2010/0227559 A1    Sep. 9, 2010

(30) Foreign Application Priority Data

Feb. 4, 2009  (EP) ..................................... 09290085

(51) Int. Cl.
*H04W 4/00* (2018.01)
*H04B 1/38* (2015.01)

(52) U.S. Cl.
CPC ..................................... *H04B 1/38* (2013.01)

(58) Field of Classification Search
CPC .................................................. H04W 4/008
USPC ..................................... 455/41.1, 41.2, 41.3
See application file for complete search history.

(56) References Cited

U.S. PATENT DOCUMENTS

| | | | |
|---|---|---|---|
| 7,636,549 B2 * | 12/2009 | Ma et al. | ..................... 455/41.2 |
| 2003/0050009 A1 | 3/2003 | Kurisko et al. | |
| 2004/0192383 A1 * | 9/2004 | Zacks | ................... H04L 63/102 |
| | | | 455/557 |
| 2005/0152294 A1 | 7/2005 | Yu et al. | |
| 2005/0164634 A1 * | 7/2005 | Tanaka | ................ H04L 63/0492 |
| | | | 455/41.2 |
| 2006/0068760 A1 | 3/2006 | Hameed et al. | |
| 2006/0143455 A1 | 6/2006 | Gitzinger | |
| 2007/0249286 A1 | 10/2007 | Ma et al. | |
| 2008/0057868 A1 | 3/2008 | Chang | |
| 2008/0166966 A1 * | 7/2008 | Hamasaki | ............ H04B 1/3805 |
| | | | 455/41.2 |
| 2009/0111378 A1 * | 4/2009 | Sheynman et al. | .......... 455/41.1 |

FOREIGN PATENT DOCUMENTS

| | | |
|---|---|---|
| JP | 2006-174383 | 6/2006 |
| KR | 2006-0117990 | 11/2006 |
| WO | WO 2008/027910 A1 | 3/2008 |

OTHER PUBLICATIONS

European Search Report.

* cited by examiner

*Primary Examiner* — Wen Huang
(74) *Attorney, Agent, or Firm* — Fay Sharpe LLP

(57) ABSTRACT

The present invention refers to a method for configuring a radio communication channel between at least a first and a second devices wherein said devices comprise a physical data port and radio communication means, said method comprising the following steps:
- a step of setting in contact the physical data port of said at least first and second devices in order to establish a physical connection between the physical data ports of said at least first and second devices;
- a step of configuration data exchange through the physical connection;
- a step of radio communication channel configuration.

11 Claims, 6 Drawing Sheets

METHOD AND EQUIPMENT FOR CONFIGURING RADIO COMMUNICATIONS

BACKGROUND OF THE INVENTION

The present invention relates to the field of short range communications and more specifically to the configuration of such communications.

In the past few years, several technologies have been developed to allow short distance communications between wireless devices. Such communications allow to exchange data with high data rates and high quality of transmission thus providing a large range of applications such as voice transmissions or data exchanges.

Nevertheless, in the case of one time data exchanges, for example in the case of a business card exchange, the short range radio communication techniques of the state of the art require several manipulations for configuring the communication between both devices and the configuration time is often longer than the time required for the transmission itself. The configuration appears therefore to be an obstacle and a loss of time in the use of said short range radio transmission.

SUMMARY OF THE INVENTION

It is therefore an object of the present invention to overcome the above cited drawbacks of the state of the art and provide a method for enabling fast and easy configuration of the short range radio communications.

Thus, the present invention refers to a method for configuring a radio communication channel between at least a first and a second devices wherein said devices comprise a physical data port and radio communication means, said method comprising the following steps:
- a step of setting in contact the physical data port of said at least first and second devices in order to establish a physical connection between the physical data ports of said at least first and second devices;
- a step of configuration data exchange through the physical connection;
- a step of radio communication channel configuration.

In another embodiment, said method comprises an additional step of radio communication type selection before the step of radio communication channel configuration.

In a further embodiment, the radio communication comprises a Bluetooth® type communication.

In an additional embodiment, the radio communication comprises a WIFI™ type communication.

In a supplementary embodiment, said method comprises an additional preliminary step of activation of the physical data port.

In another embodiment, the physical connection is managed by a slotted type protocol such as an ALOHA type protocol.

In an additional embodiment, the information exchanged during the electrical communication comprises:
- a terminal ID;
- a list of the available radio communication interfaces;
- the required information to configure and set up the radio communications.

The present invention also refers to a computer program for configuring a radio communication channel between at least a first and a second devices wherein said devices comprise a physical data port and radio communication means, said computer program comprising instructions for implementing the following steps:

exchanging configuration data through the physical connection formed by the contact of the physical data port of said devices;
configuring a radio communication channel.

The present invention also refers to a radio communication device comprising:
- configuration means for configuring a radio communication channel and,
- radio communication means for achieving radio communication,
- wherein said configuration means comprise a physical data port to be contacted to a physical data port of another radio communication device.

In another embodiment, the physical data port comprises two electrodes and a metallic interface.

In an additional embodiment, the physical data port comprises an electrical plug.

DETAILED DESCRIPTION OF THE INVENTION

As used herein, the term "physical port" refers to an interface allowing to provide a connection when setting in contact or in close proximity of an analogous interface;

As used herein, the term "physical connection" refers to a connection achieved by the close proximity or contact of two physical ports;

As used herein, the term "CRC" refers to the acronym contact radio configuration;

As used herein, the term "CRCP" refers to the acronym contact radio configuration protocol;

As used herein, the term "PDA" refers to the acronym personal digital assistant;

The idea of the present invention is to simplify and ease the configuration of short range radio communications such as WIFI™ or Bluetooth® communications and refers to the use of a connection between the physical ports of two communication devices. Indeed, said physical connection allows to rapidly exchange the configuration data required to set up the short range radio communication.

Figure 1:
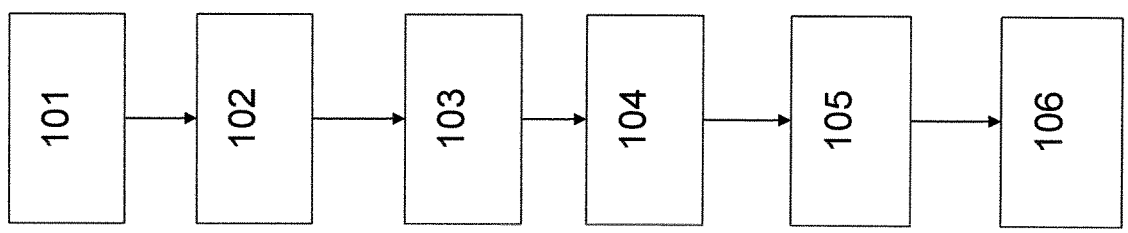
FIG. 1 is a synoptic diagram representing the different steps of the present invention.

The different steps of the method will now be described in detail based on the diagram of FIG. 1.

The first step (101) corresponds to the activation of the physical connection mode by the user of the device. Said activation can be protected by a password to prevent access when the device is unattended.

The second step (102) is the setting in contact of the physical ports. Several embodiments are possible for said physical ports.

Figure 2:
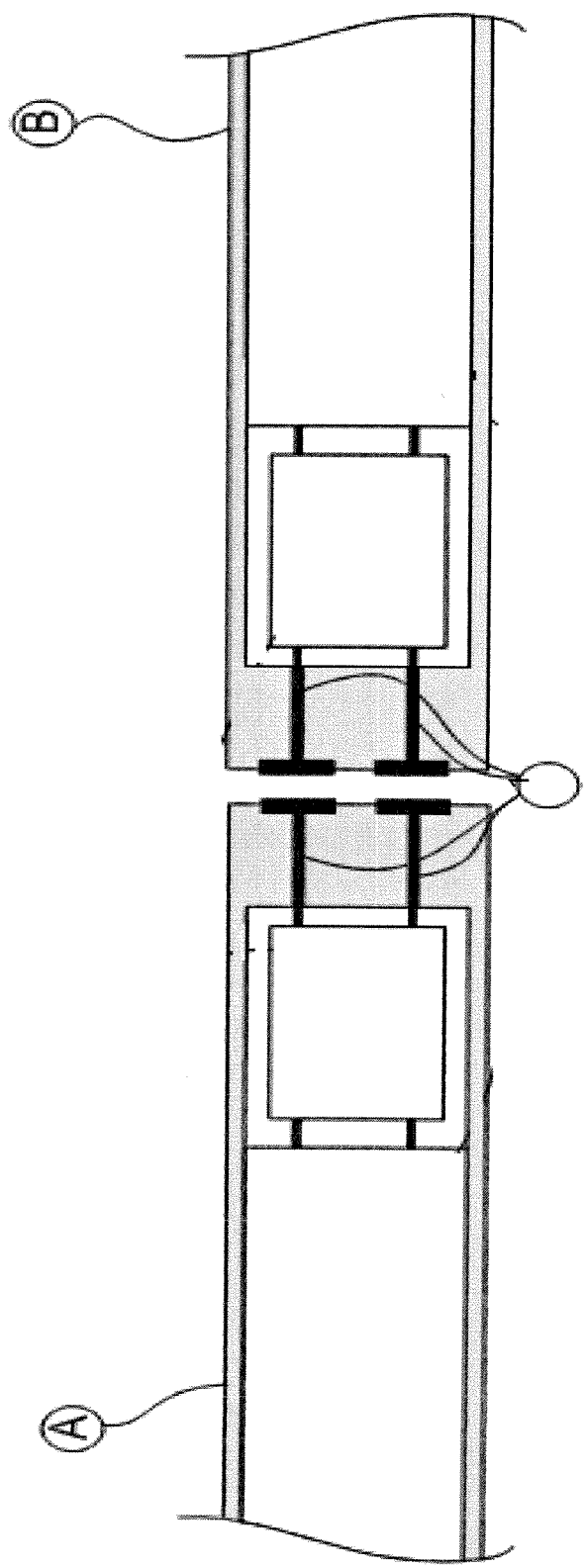
FIG. 2 is a diagram of a possible embodiment of the physical ports of two devices according to the present invention.
Figure 3:
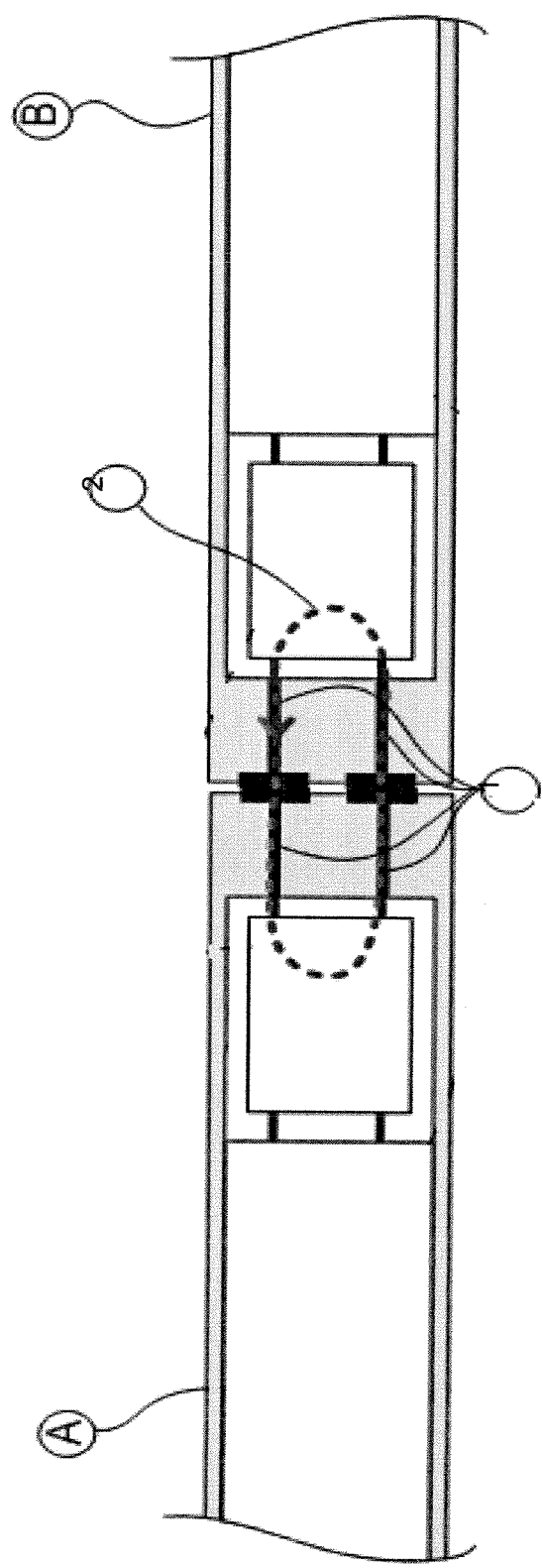
FIG. 3 is a diagram of the physical connection between two devices equipped with an embodiment of the present invention.

In a first embodiment, said port comprises a dipole such as described in FIG. 2 wherein two terminal ports (A and B) are represented. Each dipole is made up of two electrodes 1. The setting in contact of both devices produce an electrical circuit 2 as represented in FIG. 3.

It has also to be noted that the value of current and voltage used in the electrical circuit 2 have to be as small as possible in order to limit the power consumption.

Figure 4:
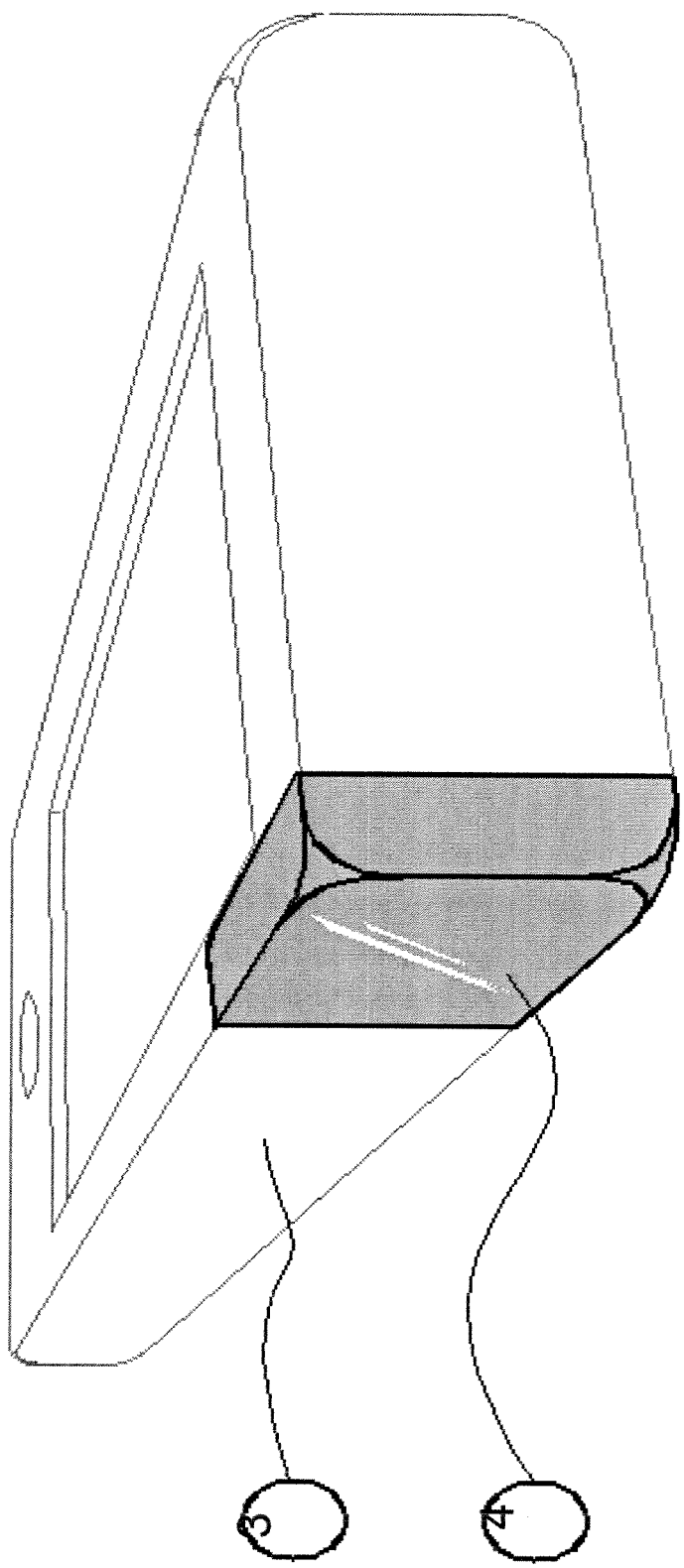
FIG. 4 is an external view of a wireless device equipped with an embodiment the present invention.

Moreover, to protect the electrodes 1, a metallic protection 4 is disposed to cover them as presented in FIG. 4. Thus, thanks to this metallic piece 4 on the case 3 of his device, the user knows the location of the dipole 1 and can easily set said metallic piece 4 in contact with the electrodes 1 of the other device.

The electrodes 1 can be located anywhere on the device, for example on a corner of the device or on a protuberance in order to ease the contact with other devices.

In another embodiment, said physical port can be a plug and the connection is achieved by plugging the devices together.

The following step (103) refers to the exchange of configuration data through the physical connection described previously.

Said data comprise all the required information for configuring the available short range radio communications of the device such as, for example, a terminal ID, a list of the available radio interfaces (Bluetooth®, WIFI™ . . . ), the corresponding keys and codes (Pin code, WIFI™ key, password . . . ) . . . .

Figure 5:
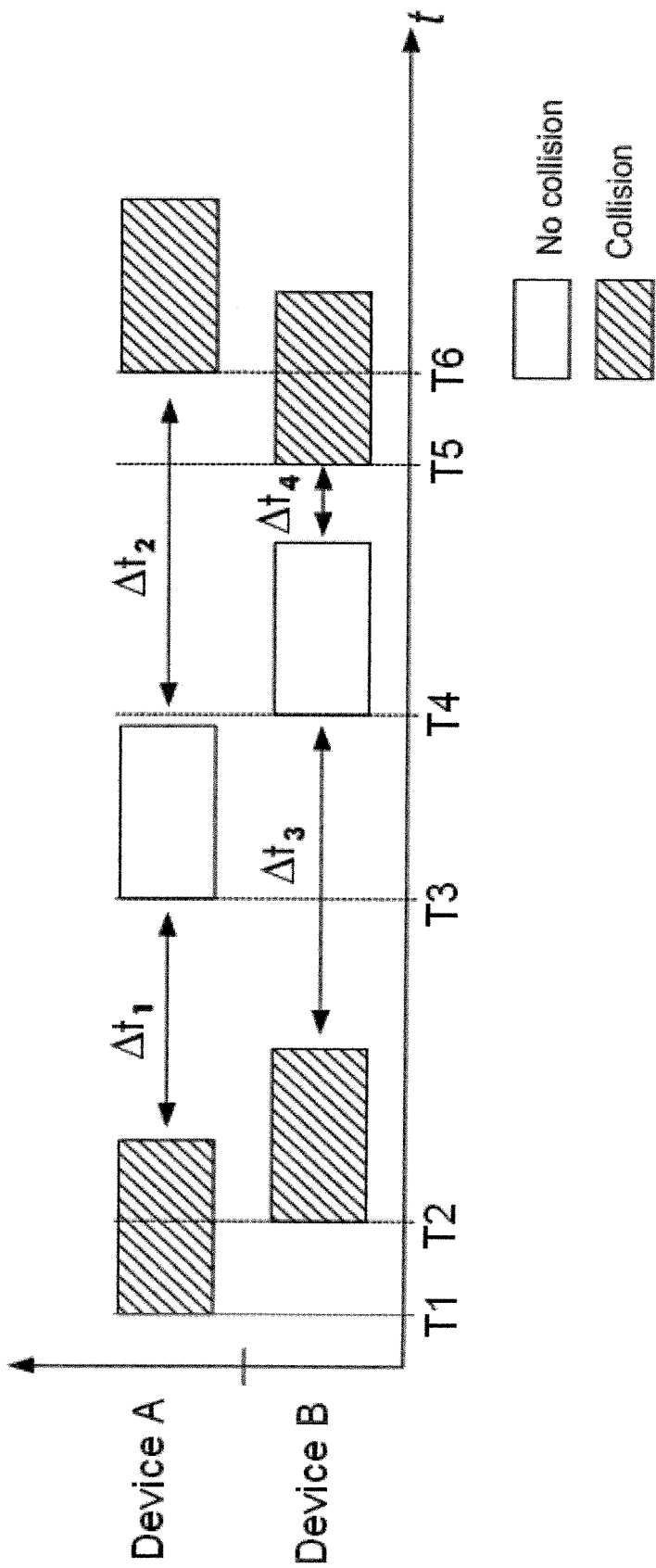
FIG. 5 is a graph representing the principle of an ALOHA data exchange protocol.

To manage the exchange of data between two devices, a protocol is required. This protocol can be for example an ALOHA protocol such as described in FIG. 5. In an ALOHA protocol, both devices are emitters and listeners. Said protocol refers to the management of the collisions occurring between the data packets sent by each device. Basically, a device sends a data packet. Either the packet is received by the other device or a collision with a packet being transmitted in the opposite direction prevents the packet from being received. In the case of a collision, the packet is resent after a random amount of time until no collision occurs. In the example of FIG. 5. Device A sends a packet at time T1 and device B a packet at time T2. As the time to transmit a packet is higher than T2-T1, a collision occurs. According to the ALOHA protocol, device A waits for a random time $\Delta t_1$, while device B waits for a random time $\Delta t_3$. Thus, device A resends a data packet at time T3. The time before device B sends another packet is then large enough for the transmission and no collision occurs. Due to the random effect, all the transmissions will eventually be completed even if many trials may be necessary.

Nevertheless, the amount of data needing to be exchanged being reduced, the time of the exchange is very short.

After data exchange, the physical ports are automatically disabled in order to prevent unwanted connections or hacking.

Step 104 refers to the processing of the received data.

Moreover, if several short range radio communication types are available, an additional step 105 of radio communication type selection can be introduced in order for the user to select the desired communication type. However, the selection can also be performed automatically in function of predetermined criteria. For example, the user can classify the different communication type according to his preferences so that the preferred available type is selected.

When the communication type is selected, the configuration of said selected communication can be achieved (step 106). Indeed, all the required information to perform the configuration are available by the device so that the communication can be set up as soon as both devices are configured.

In order for the present invention to be widely used, a standard needs to be defined. The offered solution is called contact radio configuration protocol (CRCP) and the corresponding architecture is presented in FIG. 6.

The CRCP daemon program comprises a connection controller that manages the different entities involved in the protocol architecture.

Figure 6:
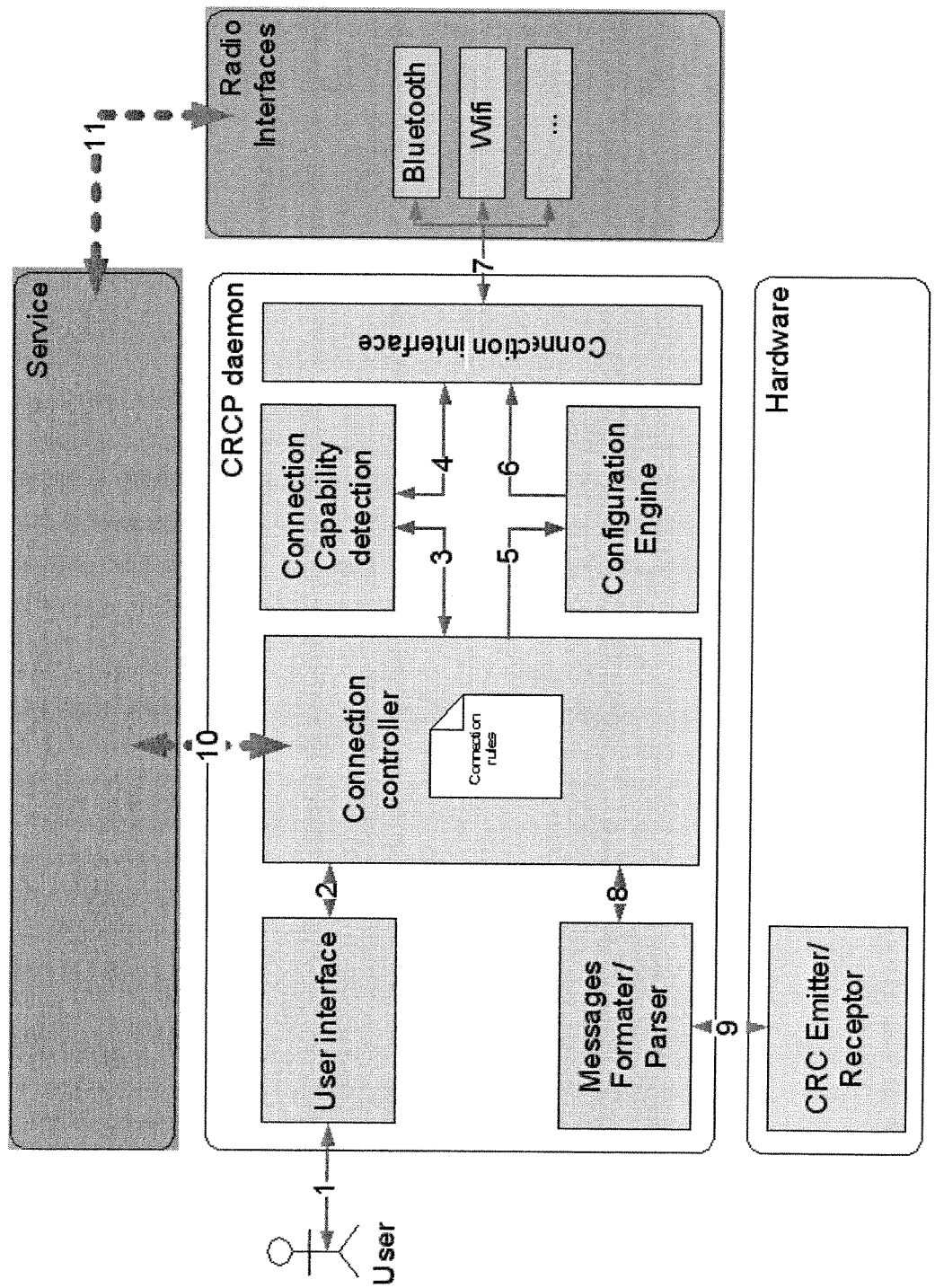
FIG. 6 is a diagram showing a possible embodiment of the system architecture of the present invention.

Based on FIG. 6 and the previously described steps of the method, the user enables the direct contact radio configuration (step 101) through the user interface (arrows 1 and 2). Then, the connection controller sends, through the messages formatter/parser, the activation order to the CRC emitter/receptor. Configuration data are then exchanged with the other device and the received data are processed by the message parser to extract said data in the right format (arrows 8 and 9). The connection capability is then determined using a connection capability detection module and a connection interface (arrows 3, 4 and 7). Using the connection capabilities, the connection rules and the configuration data transmitted by the other terminal or device, the connection controller can select the preferred interface or ask the user to select his preference among the available choices (step 104 and 105).

Once a communication type is selected, the connection controller uses the configuration data extracted from the received message sent by the other terminal to provide the required parameters to the configuration engine (arrow 5). Said configuration engine configures the selected radio communication interface (step 106) through the connection interface (arrows 6 and 7) and the adequate radio interface is turned on. The arrows 10 and 11 correspond to the communications with the service provider to get authorization and connectivity.

In order to better understand the present invention, an example of use of the present invention will now be described.

A first user Tom meets his friend Bob. Tom has a few pictures of Bob in the memory of his cellphone and Bob would like to get the pictures transferred on his personal digital assistant (PDA). Tom's cellphone is equipped with Bluetooth® interface and Bob's PDA is equipped with WIFI™ and Bluetooth® interface.

In order to configure a communication, Tom and Bob activate the CRCP of their devices and put their respective physical port in contact. After a couple of seconds, configuration data have been exchanged between both devices and the Bluetooth® interface which is the only common interface is automatically selected and configured. The Bluetooth® communication is then turned on and Tom can transfer the pictures to Bob. At the end of the configuration data exchange, the contact ports are automatically disabled. After activation, the Bluetooth® communication can either stay active until the user turns off its Bluetooth® mode or can become inactive after a predetermined amount of time of inactivity of the Bluetooth® function.

Moreover, the present invention is not limited to data exchanges between portable devices but can be used for any type of short range communications. For example, a cell phone may be use as a Bluetooth® remote control for a TV set. In this case, The Bluetooth® configuration is also achieved as described previously.

Thus, the previous invention allows to reduce the required time and simplify the configuration of a short range radio communication while keeping a secured protocol thanks to the use of a contact connection between physical data ports.

The invention claimed is:

1. A method for configuring a radio communication channel between a first device and a second device wherein said first and second devices each include a physical data port and a radio communicator, said method comprising:
   providing a direct physical contact between the physical data ports of said first and second devices in order to establish communication between the physical data ports of said first and second devices;
   exchanging configuration data through the direct physical contact; and
   configuring a radio communication channel between the radio communicators of the first and second devices in accordance with the exchanged configuration data.

2. The method in accordance with claim 1, wherein said method further comprises:
   selecting a radio communication type before said configuring.

3. The method in accordance with claim 1, wherein the radio communication comprises Bluetooth® communication.

4. The method in accordance with claim 1, wherein the radio communication comprises WIFI™ communication.

5. The method in accordance with claim 1, wherein said method comprises activating the physical data port.

6. The method in accordance with claim 1, wherein the physical connection is managed by an ALOHA protocol.

7. The method in accordance with claim 1 wherein the information exchanged during the electrical communication comprises:
   a terminal ID;
   a list of the available radio communication interfaces;
   the required information to configure and set up the radio communications.

8. A non-transitory computer readable medium including thereon a computer program for configuring a radio communication channel between first and second devices wherein said devices each include a physical data port and a radio communicator, said computer program comprising instructions for implementing at least the following steps:
   exchanging configuration data through a direct physical connection formed by the contact of the physical data ports of said first and second devices; and
   configuring a radio communication channel between the first and second devices in accordance with the exchanged configuration data.

9. A radio communication device comprising:
   a configuration part provisioned to configure a radio communication channel, and
   a radio communicator provisioned to achieve radio communication,
   wherein said configuration part comprises a physical data port arranged to be directly contacted to a physical data port of another radio communication device such that when so contacted configuration data is exchange between the radio communication devices through said contact and a radio communication channel between the radio communication devices is configured according to the exchanged configuration data.

10. The radio communication device in accordance with claim 9, wherein the physical data port comprises two electrodes and a metallic interface.

11. The radio communication device in accordance with claim 9, wherein the physical data port comprises an electrical plug.

* * * * *